United States Patent [19]

Fisher

[11] Patent Number: 4,498,790
[45] Date of Patent: Feb. 12, 1985

[54] BUSHING SECURING APPARATUS

[75] Inventor: James E. Fisher, Palm Beach Gardens, Fla.

[73] Assignee: United Technologies Corporation, Hartford, Conn.

[21] Appl. No.: 553,935

[22] Filed: Nov. 21, 1983

[51] Int. Cl.³ .................... F03D 11/04; F16C 33/02
[52] U.S. Cl. ................................. 384/428; 384/296; 384/906; 415/160
[58] Field of Search ............... 384/247, 252, 253, 296, 384/295, 428, 435, 436, 280; 308/178; 105/218; 474/101, 113; 415/162, 160, 159; 416/221

[56] References Cited
U.S. PATENT DOCUMENTS

| | | | |
|---|---|---|---|
| 1,155,175 | 9/1915 | Van Law | 308/178 X |
| 1,220,991 | 3/1917 | McGinley | 384/295 |
| 3,281,907 | 4/1966 | Featheringham | 384/435 X |
| 3,584,923 | 6/1971 | Goossens | 384/296 |

Primary Examiner—Lenard A. Footland
Assistant Examiner—Lynn M. Sohacki
Attorney, Agent, or Firm—Stephen E. Revis

[57] ABSTRACT

Adjacent cylindrical bearings disposed within a wall are prevented from rotating and moving axially by a sheet metal tablock which simultaneously engages a slot in the external surfaces of each bearing. A cap fits around each bearing, and a flange on each cap overlies the tablock. Tab ends of the tablock are folded over the flange and trap the tablock in position.

3 Claims, 5 Drawing Figures

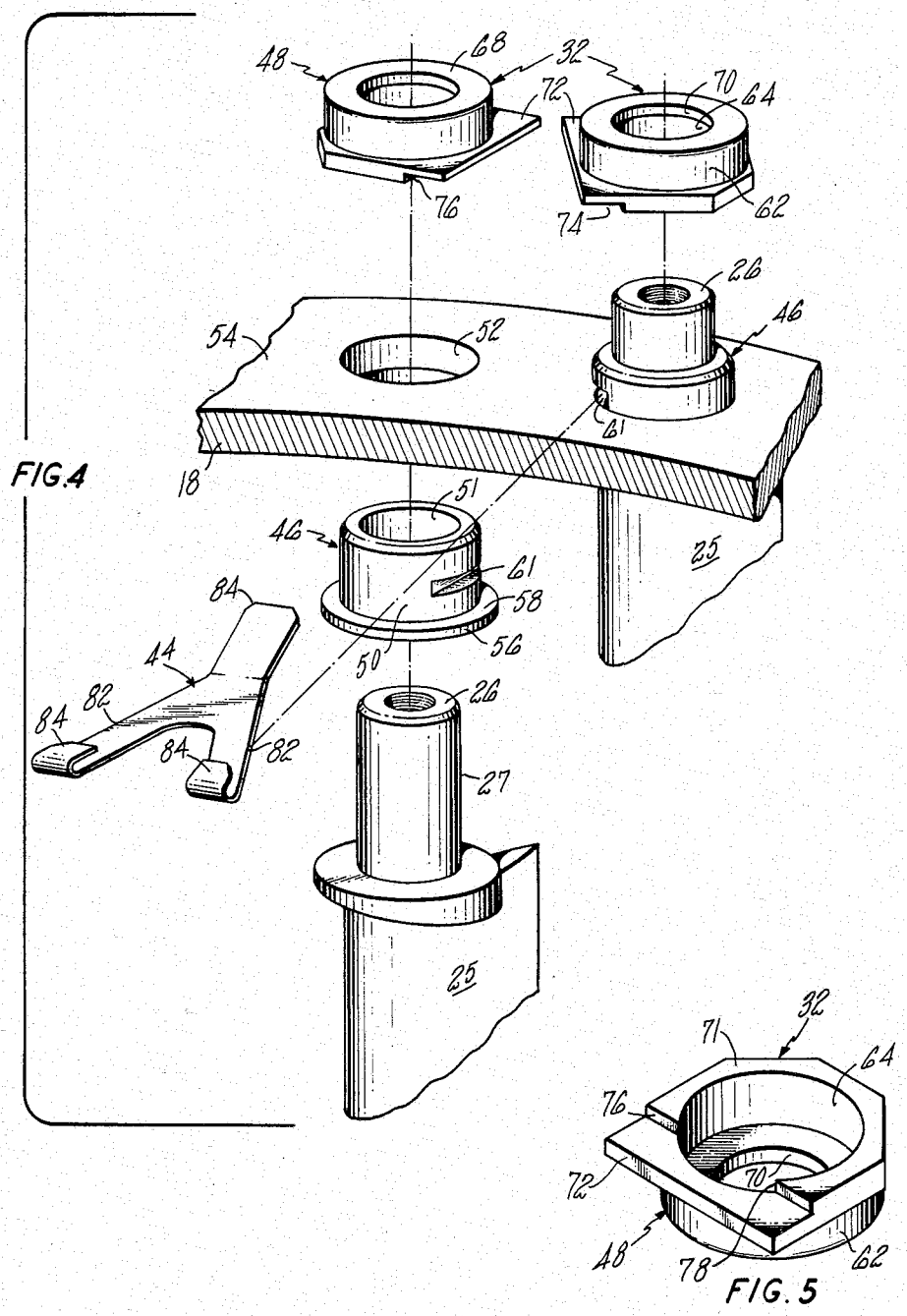

BUSHING SECURING APPARATUS

The Government has the rights in this invention pursuant to Contract No. F33657-82-C-0003 awarded by the Department of the Air Force.

DESCRIPTION

1. Technical Field

This invention relates to bushings, such as for the stems of rotatable stator vanes in a gas turbine engine.

2. Background Art

It is necessary to hold a bushing stationary relative to the part which rotates within it. It may also be required to prevent movement of the bushing relative to some fixed structure, such as with respect to a wall within which the bushing is disposed. For example, vane stems of rotatable stator vanes in a gas turbine engine pass through a bushing disposed in an engine case. The bushing locates the vane stem relative to the engine case and provides a bearing surface for the stem. Improved lightweight, low cost means for holding the bushings in position within the wall, to prevent them from rotating as the vanes rotate, and to allow easy assembly and disassembly of the vane stage is always being sought.

DISCLOSURE OF INVENTION

One object of the present invention is improved means for retaining and preventing rotation of a bushing.

Another object of the present invention is lightweight simplified means for retaining and preventing rotation of bushings.

According to the present invention, a pair of adjacent cylindrical bushings are prevented from rotating and moving in at least one axial direction by a sheet metal tablock disposed between them and in engagement with an exposed end of each bushing.

More specifically, oppositely facing edges of the tablock fit within a slot in the outer cylindrical surface of each bushing just above the surface of a wall in which the bushings are disposed. A cylindrical cap disposed on and surrounding the end of each bushing includes a flange which overlies the tablock. The tablock has a plurality of tabs which fold over the flanges of the two adjacent bushings trapping the tablock in position between the pair of bushings and within the slots of the bushings. The tablock thereby prevents rotation of both bushings and prevents axial movement of the bushings in one direction. Means on the other side of the wall through which the bushings extend prevents axial movement of the bushings in the opposite direction. Thus, the bushings cannot rotate or move axially.

The tablocks are easy to install, are lightweight, and are easily removed for disassembly. Only one tablock is required for every two bushings.

The foregoing and other objects, features and advantages of the present invention will become more apparent in the light of the following detailed description of the preferred embodiments thereof as shown in the accompanying drawings.

BRIEF DESCRIPTION OF THE DRAWING

FIG. 4 is an exploded, perspective view of the bushing assembly of the present invention.

FIG. 5 is a perspective view of the retainer cap of a bushing according to the present invention.

BEST MODE FOR CARRYING OUT THE INVENTION

Figure 1:
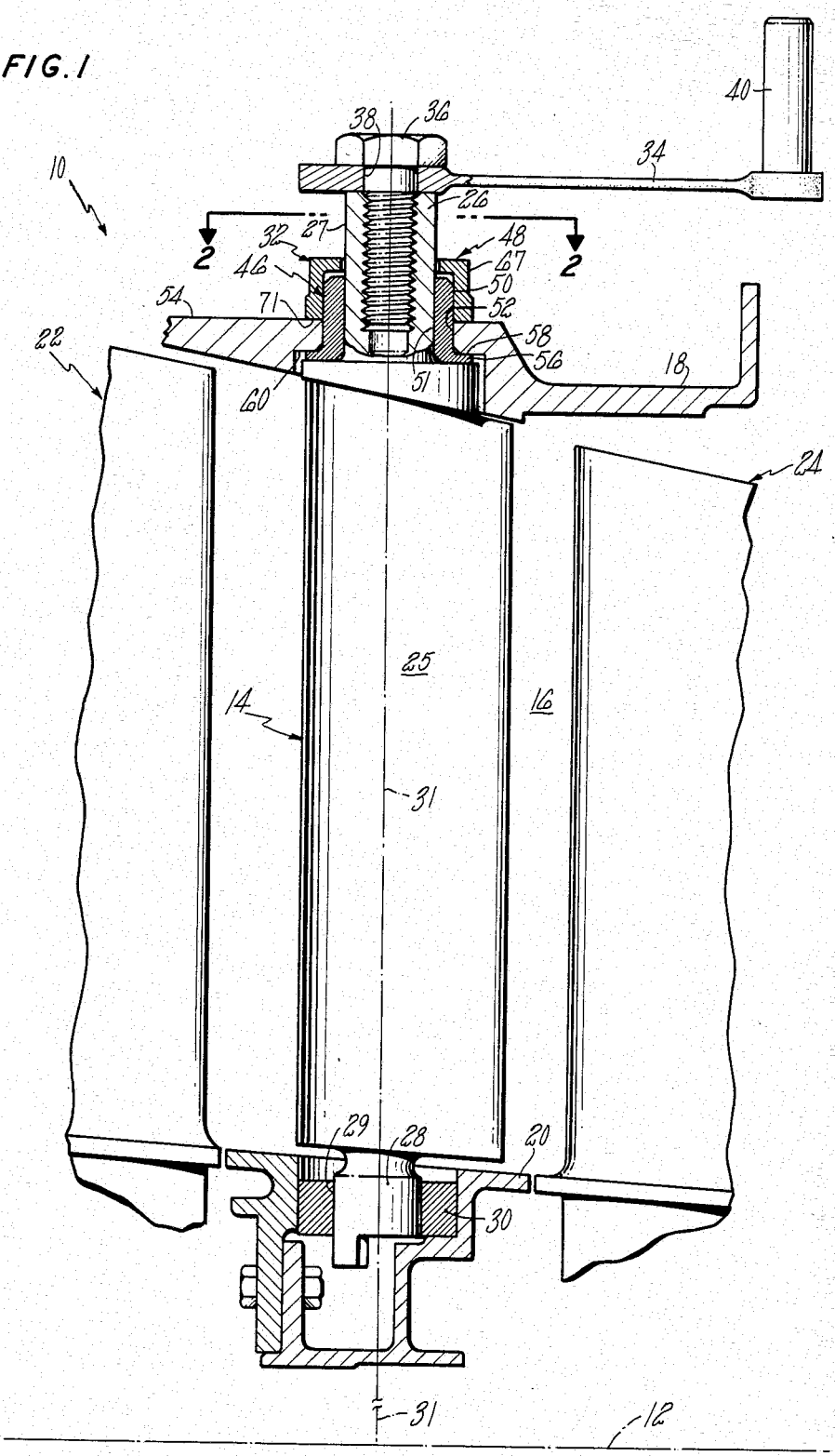
FIG. 1 is a sectional view of a portion of a gas turbine engine compressor comprising variable stator vanes incorporating the bushing assembly of the present invention.

As an exemplary embodiment of the present invention, consider the portion of a gas turbine engine compressor 10 shown in FIG. 1. The engine axis is designated by the numeral 12. The compressor 10 includes a stage of variable stator vanes 14 disposed across a gas flow path 16 defined between an outer case 18 and an inner support ring 20. A compressor rotor stage 22 is disposed upstream of the stator vanes 14, and a compressor rotor stage 24 is disposed downstream of the stator vane 14.

Each vane 14 includes an airfoil 25, an outer vane stem 26 and an inner vane stem 28, both stems having outer cylindrical surfaces 27, 29, respectively. Each vane rotates about a vane axis 31 which is a radial line. The inner vane stem 28 is disposed within a bearing 30 which is secured to the support ring 20. The outer vane stem 26 is disposed within a bushing 32 secured to the outer case 18 by means hereinafter described.

Each vane 14 has a vane arm 34 securely attached to its vane stem 26 by means of a bolt 36 which passes through a hole 38 in one end of the vane arm 34 and is threaded into the vane stem 26. The other end of the vane arm 34 includes an outwardly extending pin 40 which cooperates with a unison ring (not shown) surrounding the engine axis 12. Rotation of the unison ring about the engine axis results in simultaneous rotation of all the vane arms 34 about their respective vane axes 31, which results in a corresponding rotation of each vane 14.

Figure 2:
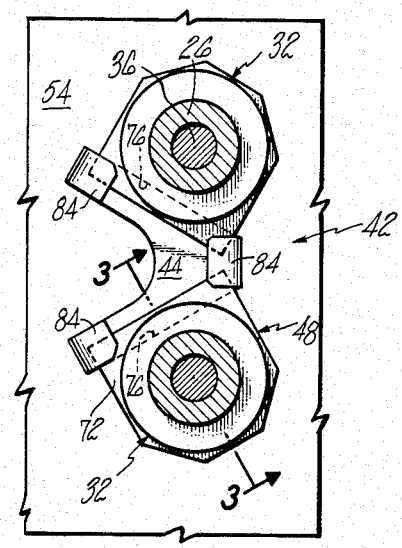
FIG. 2 is a sectional view taken along the line 2—2 of FIG. 1.
Figure 3:
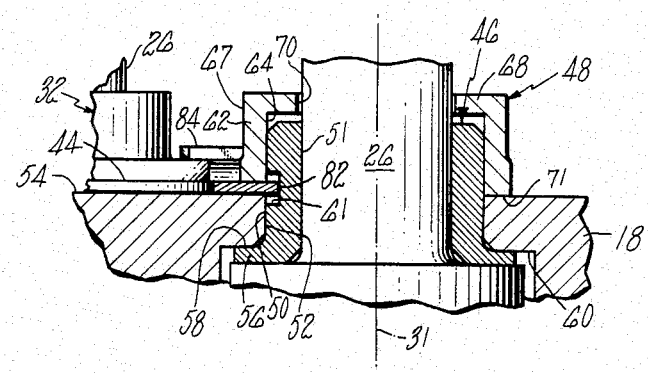
FIG. 3 is a sectional view taken along the line 3—3 of FIG. 2.

The bushings 32 of adjacent pairs of vanes are part of a bushing assembly 42 best shown in FIGS. 2 and 3. Each assembly 42 comprises a pair of bushings 32 and a tablock 44. Referring to FIGS. 1 through 5, each bushing 32 includes a bearing 46 and a retainer cap 48. The bearing 46 includes an outer cylindrical surface 50 and an inner cylindrical bearing surface 51. The surface 50 fits closely within a circular opening 52 in the case 18. The outer end of the bearing 46 extends beyond the outwardly facing surface 54 of the case 18. The inner end of the bearing 46 includes an annular flange 56 having a surface 58 perpendicular to the vane axis 31 and which contacts an oppositely facing surface 60 of the case 18, thereby preventing movement of the bearing 46 radially outwardly. Each bearing 46 also has a slot 61 in its outer cylindrical surface 50 immediately above the surface 54 of the case 18. The purpose of the slot will be explained hereinbelow.

The cap 48 includes a wall portion 62 having an inner cylindrical surface 64 which mates with the outer cylindrical surface 50 of that portion of the bearing 46 extending above the surface 54 of the case 18. The outer end 67 of the cap 48 comprises a wall 68 which has a hole 70 therethrough, through which the vane stem 26 passes. As best shown in FIGS. 4 and 5, the inner end of the cap 48 includes a radially outwardly extending flange portion 72 and a bottom surface 71. The bottom surface 71 has an elongated notch 74 extending thereacross along one side of the cap. The notch 74 cuts through the internal cylindrical surface 64 of the cap defining a cutout 78 in the wall portion 62. The slot 61 in each bearing 46 is aligned with the cutout 78 in its respective cap 48. The flange portion 72 of each cap 48 overlies a portion of the tablock 44 which fits within the notch 74. The bottom surface 71 of the cap 48 contacts the surface 54 of the wall 18 all the way around the bearing 46, except in the vicinity of the notch 74.

The slots 61 in each of the two bearings 46 of the bushing assembly 42, and the rear edges 76 of the notches 74 in each bearing 46 of the bushing assembly 42 are in facing relationship. Preferably, as shown in FIG. 2, the notch rear surfaces 76 converge toward each other. The sheet metal Y-shaped tablock 44 includes opposing side edges 82 which converge toward each other at the same angle that the rear edges 76 of the notches 74 converge toward each other. The tablock 44 is slid between the pair of bushings 32 into the notches 74 until the edges 82 of the tablock are juxtaposed the respective rear edges 76 of the notches, in which position they also engage the slots 61 in each of the bearings 46. Each of the two curved tab ends 84 of the tablock 44 hook over the flange portion 72 of one of the caps 48. The other end 86 of the tablock is flat during assembly and is folded up and over the corners of flange portions 72 of both caps 48 to trap the tablock 44 into position.

It should be apparent that, with the tablock 44 in position, neither bushing 32 of the bushing assembly 42 can rotate or move radially. Further, the tablock 44 cannot be fully inserted between the bushings 32 unless the bushings 32 are oriented properly and the slots 61 in each bearing 46 are aligned with the cutouts 78 in their respective cap 48.

Although the invention has been shown and described with respect to a preferred embodiment thereof, it should be understood by those skilled in the art that various changes and omissions in the form and detail thereof may be made therein without departing from the spirit and scope of the invention.

I claim:

1. A bushing assembly comprising:
    wall means having a pair of adjacent circular openings therethrough, each of said openings having an axis, said wall means having first and second oppositely facing surfaces;
    first and second bushing means, each including a cylindrical bearing disposed, respectively, within one of said cylindrical openings and axially concentric therewith, said cylindrical bearings each extending beyond said first surface of said wall means, each of said bushing means including means for preventing movement of said bearings in a first axial direction from said second toward said first surface through said circular opening, said bearings each having an outer cylindrical surface with a slot therein and an inner cylindrical bearing surface, each slot being spaced immediately above said first wall surface, said slot in one of said bearings being in facing relationship to said slot in said other of said bearings, each bushing means including a separate retainer cap having an external wall surface and an internal cylindrical surface surrounding and in contact with said outer cylindrical surface of its respective bearing, each cap having a bottom surface in contact with said first wall surface, each cap also including an elongated notch in its bottom surface, said notch cutting through said internal cylindrical surface of said cap defining a cutout aligned with said slot in said bearing, said notch also including a rear surface, said rear surface being in facing relationship to said rear surface of said notch in said cap of said other one of said bearings;
    a sheet metal tablock disposed between said first and second bushing means, said tablock including a pair of oppositely facing edges, one of said edges being disposed in said notch and engaging said slot of said first bushing means, said other of said edges being disposed in said notch of said second bushing means and engaging said slot in said second bushing means, each of said retainer caps including flange means extending radially outwardly from said external wall surface, said flange means overlying said tablock, said tablock including a plurality of tabs folded over said flange means of each of said caps wherein said tablock is trapped in position between said first and second bushing means and prevents movement of said first and second bushing means in a second axial direction opposite said first axial direction and also prevents rotation of both bushing means.

2. The bushing assembly according to claim 1 wherein said notch of each cap includes a rear surface, said rear surface of said cap of said first bushing means being in facing relationship to said rear surface of said cap of said second bushing means, each of said opposed edges of said tablock being juxtaposed said rear surface of said notch within which it is disposed.

3. The bushing assembly according to claim 2 wherein said rear surfaces of said notches in said caps converge toward each other, and said oppositely facing edges of said tablock are each parallel to one of said converging rear surfaces.

* * * * *